Patented Aug. 14, 1934

1,970,372

UNITED STATES PATENT OFFICE 1,970,372

PROCESS FOR PRODUCING A FERTILIZER FROM RAW PHOSPHATE

Stefan Julius Gelhaar, Ljungaverk, Sweden, assignor to Stockholms Superfosfat Fabriks Aktiebolag, Stockholm, Sweden, a corporation of Sweden No Drawing. Application May 6, 1933, Serial No. 669,794. In Sweden May 21, 1932

11 Claims. (Cl. 71—7)

During the last years several proposals have been made to decompose raw phosphates with diluted nitric acid usually for the purpose of preparing a fertilizer containing both phosphoric acid and nitrogen. These processes generally are based on the producing of a solution which, after separation of the insoluble constituents, is evaporated to dryness. However, trials have also been made to decompose the raw phosphate with concentrated nitric acid for the purpose of obtaining directly a fertilizer, the method then being analogous to the production of superphosphate. On making such trials, however, one has met with the very considerable difficulty that during the reaction an essential decomposition of the nitric acid takes place.

Finally, attempts have been made to mix the raw phosphate with acid alkali or ammonium salts, such as bi-sulphates, either alone or mixed with acids, for instance nitric acid, but these methods have not given satisfactory results, since in most cases only a mechanical mixture has been obtained.

According to the present invention the phosphoric acid of the raw phosphate is converted into soluble state by intimately mixing ground raw phosphate with a required quantity of solid ammonium trinitrate ($NH_4.NO_3 2HNO_3$) or potassium trinitrate ($KNO_3.2HNO_3$), which compounds very easily can be made from concentrated nitric acid together with the base of the compound. By using such a solid salt for the decomposition of the raw phosphate the advantage is gained that practically no or a very little decomposition of the nitric acid takes place. This is evidently due to the fact that the solid trinitrate reacts more slowly with the raw phosphate than the liquid acid, the addition of which easily causes local superheatings.

If ammonium trinitrate is used, the following principal reaction takes place:

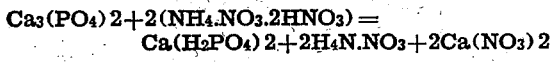
$$Ca_3(PO_4)_2 + 2(NH_4.NO_3.2HNO_3) =$$
$$Ca(H_2PO_4)_2 + 2H_4N.NO_3 + 2Ca(NO_3)_2$$

Further, the carbonates contained in the raw phosphate are neutralized. The reaction needs a certain time for being accomplished, but it may be accelerated by means of heating. The trinitrates may either be added to the raw phosphate all at once or a little at a time so that the mixture is all the time maintained nearly neutral. The product obtained is exposed to drying as it has been proved that a mixture which has been dried is much less hygroscopic than the undried goods.

Since the melting point of the trinitrates being very low (for both of the above named trinitrates it lies between 20° and 30° C.) the mixture gets viscous. Owing to this fact the mixture may by stirring easily be converted into small grains during the drying process, and can thus easily be sprinkled.

Example 1

100 parts by weight of raw phosphate containing about 30% of $P_2O_5$ and about 10% of $CaCO_3$ were mixed with 150 parts of ammonium trinitrate, whereafter the mixture was dried under stirring. Thereby a granular product was obtained containing about 12% $P_2O_5$ soluble in water, 12% nitrate-nitrogen and 4% ammonia nitrogen.

Example 2

100 parts by weight of raw phosphate with the same composition as in Example 1 were mixed with 165 parts of potassium trinitrate and were dried under stirring. Thereby a granular product was also obtained, containing about 12% $P_2O_5$ soluble in water, 15% N and 12% $K_2O$.

As the mixture obtained according to the present method is adapted to be used as a fertilizer it may sometimes be convenient to give the product a somewhat different composition than that obtained directly according to the above mentioned method. For this purpose part of the trinitrate (at most half of the same) may be substituted by nitric acid or phosphoric acid or both. Instead of nitric acid a solution containing such acid, for instance the mother liquor obtained in producing trinitrates, may be used.

The above described reaction between raw phosphate and acid requires a certain time for being accomplished. Thus, if raw phosphate is mixed with the calculated quantity of ammonium trinitrate it will take several hours before the reaction is accomplished. It has now been found that this reaction can be accomplished in a much shorter time if before, simultaneously with or after the mixing operation so much water is added that the mono-calciumphosphate formed will take up one molecule of water of crystallization.

Example 3

25 parts by weight of raw phosphate containing 35% of $P_2O_5$ were mixed with 2,5 parts of water, 20 kg. of ammoniumtrinitrate and 10 parts of mother liquor from the production of ammoniumtrinitrate which liquor contained 60% of free nitric acid. After thorough mixing a dry powder was obtained containing 14% P₂O₅ soluble in water and citrate solution and 13,5% N. The reaction was in this case accomplished in less than half the time required without addition of water.

Since the melting point of the trinitrate is between 20° and 30° C. it melts rather rapidly after having been mixed with the raw phosphate. During a certain period a very viscous mass is obtained which can be transformed into granules by stirring.

If required the mixture may be dried in the ordinary manner.

For removing the last traces of free acid the mixing or drying may be executed wholly or partially in an ammonia atmosphere, or even the mixture may be besprinkled with an alkaline liquid.

The variation of the composition of the mixture obtained which has been mentioned above may also be executed in such a manner that before or after the mixing of the raw phosphate with trinitrate other substances are added, especially such substances which contain phosphoric acid, potassium oxide or nitrogen or two or all of them at the same time. If for instance the product obtained according to Example 1 is mixed with one fifth of its weight of mono-ammonium-phosphate a fertilizer is obtained containing 20% of soluble P₂O₅ and 15% of N.

If one desires to produce a more concentrated fertilizer from the mixture described it is possible to extract with any suitable dissolving agent the soluble parts and evaporate the solution thus obtained. If such extracting is made in the presence of a suitable quantity of ammonium sulphate a solution containing ammonium phosphate and ammonium nitrate is obtained, while the calcium contained in the mixture is converted into gypsum, which is removed in any convenient manner, whereafter the solution is worked up in usual way by means of evaporation.

I claim:

1. Process for producing a fertilizer from raw phosphates, consisting in mixing the raw phosphate with ammonium or potassium trinitrate in solid state, which substances are allowed to react on one another, until substantially all the phosphoric acid of the raw phosphate has been converted into soluble state.

2. Process for producing a fertilizer from raw phosphates, consisting in mixing the raw phosphate with a required quantity of solid ammonium or potassium trinitrate, adding at least so much water to the mixture that the mono-calcium-phosphate formed will take up one molecule of water of crystallization, allowing the ingredients to react on each other until substantially all the phosphoric acid of the raw phosphate has been converted into soluble state, and drying the product obtained.

3. Process for producing a fertilizer, consisting in mixing raw phosphate with a mixture of solid ammonium trinitrate and nitric acid, allowing the ingredients to react with one another until substantially all the phosphoric acid of the raw phosphate has been converted into soluble state and drying the product obtained.

4. Process as set forth in claim 2, characterized by the fact that the product obtained is dried in an atmosphere containing ammonia.

5. Process for manufacturing a fertilizer, consisting in mixing raw phosphate a little at a time with solid ammonium trinitrate, heating the mixture and allowing the ingredients to react wth one another under stirring until substantially all the phosphoric acid of the raw phosphate has been converted into soluble form, and drying the product obtained.

6. Process according to claim 2, characterized by the fact that the product is during the drying besprinkled with an alkaline solution.

7. Process for manufacturing a fertilizer consisting in mixing a raw phosphate a little at a time with ammonium trinitrate, heating the mixture and allowing the components to react with one another under stirring until substantially all the phosphoric acid of the raw phosphate has been converted into soluble state, mixing the product thus obtained with compounds containing at least one of the substances nitrogen, potassium oxide, phosphoric acid, and drying the product obtained in an atmosphere containing ammonia.

8. Process for manufacturing a fertilizer, consisting in mixing a raw phosphate with solid ammonium or potassium trinitrate, heating the mixture and allowing the components to react on one another until substantially all the phosphoric acid in the raw phosphate has been converted into soluble form, extracting the soluble constituents of the product by means of a dissolving agent, and evaporating the solution obtained to dryness.

9. Process according to claim 8, characterized by the fact that the extraction is executed in the presence of ammonium sulphate.

10. Process as set forth in claim 1, characterized by the fact that at most half of the trinitrate is replaced by phosphoric acid.

11. Method according to claim 1, characterized by the fact that the raw phosphate is mixed with trinitrate in an ammonia atmosphere.

STEFAN JULIUS GELHAAR.